(12) United States Patent
Tozzi et al.

(10) Patent No.: US 12,221,947 B2
(45) Date of Patent: *Feb. 11, 2025

(54) PREDICTIVE MODEL-BASED SPARK CONTROL

(71) Applicant: Prometheus Applied Technologies, LLC, Fort Collins, CO (US)

(72) Inventors: Luigi P. Tozzi, Fort Collins, CO (US); Maria-Emmanuella Sotiropoulou, Fort Collins, CO (US)

(73) Assignee: Prometheus Applied Technologies, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,374

(22) Filed: Jun. 3, 2024

(65) Prior Publication Data

US 2024/0318619 A1  Sep. 26, 2024

Related U.S. Application Data

(63) Continuation of application No. 18/219,692, filed on Jul. 9, 2023, now Pat. No. 12,092,063.
(Continued)

(51) Int. Cl.
*F02P 9/00* (2006.01)
*F02P 17/12* (2006.01)

(52) U.S. Cl.
CPC .............. *F02P 9/002* (2013.01); *F02P 17/12* (2013.01); *F02P 2017/121* (2013.01)

(58) Field of Classification Search
CPC .................................. F02P 9/002; F02P 17/12
(Continued)

(56) References Cited

U.S. PATENT DOCUMENTS

| | | |
|---|---|---|
| 1,930,003 A | 10/1933 | Erny |
| 1,945,870 A | 2/1934 | Stephenson |

(Continued)

FOREIGN PATENT DOCUMENTS

WO   2012091739 A2   7/2012

OTHER PUBLICATIONS

"Prechamber Combustion: Enabling the Competitive Carbon-Neutral ICE", Emmanuella Sotiropoulou, Prometheus Applied Technologies, et al, 23rd CIMAC Congress, Jun. 12-16, 2023.
(Continued)

*Primary Examiner* — Hai H Huynh
(74) *Attorney, Agent, or Firm* — Barcelo, Harrison & Walker LLP

(57) ABSTRACT

In certain embodiments, remarkable improvements in $H_2$-ICE performance may be achieved with the combination of Active Scavenge Prechamber technology and Predictive Model-Based Spark Control to overcome the drawbacks of known combustion technologies. In certain embodiments, advanced combustion modeling and simulations of the ignition process including the spark event, the arc-travel and stretching, and resulting flame propagation may be used to predict the relationship between the spark energy/power, the flow within the electrode gap, and the flame development (SOC) for different engines, different spark plugs and at various conditions. This information may be used to adjust the spark energy/power characteristic during the same cycle spark event, to minimize the SOC variations and to significantly reduce the propensity to combustion anomalies, such as backfire, knock and preignition, that prevent achieving high engine power densities and efficiencies.

30 Claims, 12 Drawing Sheets

Related U.S. Application Data

(60) Provisional application No. 63/388,359, filed on Jul. 12, 2022.

(58) Field of Classification Search
USPC ............ 123/627, 179.5, 287, 406.53, 406.54
See application file for complete search history.

(56) References Cited

U.S. PATENT DOCUMENTS

| | | | |
|---|---|---|---|
| 4,119,065 | A | 10/1978 | Noguchi |
| 4,128,081 | A | 12/1978 | Noguchi |
| 4,646,695 | A | 2/1987 | Blackburn |
| 5,555,867 | A | 9/1996 | Freen |
| 7,243,634 | B2 | 7/2007 | Tourteaux |
| 7,659,655 | B2 | 2/2010 | Tozzi |
| 8,584,648 | B2 | 11/2013 | Chiera |
| 8,839,762 | B1 | 9/2014 | Chiera |
| 9,004,042 | B2 | 4/2015 | Tozzi |
| 9,172,217 | B2 | 10/2015 | Hampson |
| 9,850,806 | B2 | 12/2017 | Tozzi |
| 9,893,497 | B2 * | 2/2018 | Chiera .................... H01T 13/32 |
| 10,024,220 | B2 * | 7/2018 | Sotiropoulou .......... F02B 19/12 |
| 10,125,665 | B2 * | 11/2018 | Sotiropoulou .......... F02B 19/18 |
| 11,248,551 | B1 | 2/2022 | VanDerWege et al. |
| 12,092,063 | B2 * | 9/2024 | Tozzi ..................... F02P 13/00 |
| 2004/0100179 | A1 | 5/2004 | Boley |
| 2005/0211217 | A1 | 9/2005 | Boley |
| 2011/0148274 | A1 | 6/2011 | Ernst |
| 2014/0102404 | A1 | 4/2014 | Sotiropoulou |
| 2016/0047294 | A1 | 2/2016 | Sotiropoulou et al. |
| 2017/0009730 | A1 | 1/2017 | Kim et al. |
| 2017/0044970 | A1 | 2/2017 | Chiera et al. |
| 2017/0314524 | A1 | 11/2017 | Hoban et al. |

OTHER PUBLICATIONS

"Ignition Energy and Ignition Probability of Methane-Hydrogen-Air Mixtures", Hankinson G., Mathurkar H., Lowesmith B.J., Loughborough University, Leicestershire, UK—Sep. 2009—h2knowledgecentre.com.

"Arc Travel Ignition Technology", Tozzi L., Sotiropoulou E., Zhu S., Prometheus Applied Technologies, LLC. Lepley D. T., Altronic, LLC, Hoerbiger Engine Solutions. Yasueda S., GDEC, Inc. 15. Tagung "Der Arbeitsprozess Des Verbrennungsmotors" Sep. 24-25, 2015.

"Optimizing High-Energy Tunable Ignition Technology: Preventing Electrode Damage while Extending the Lean Flammability Limit of Gas Engines," Lepley, D.T., et al., GMRC, Oct. 2014.

Sotiropoulou, et al., 2020. Prechamber Spark Plugs: The Evolution from Low Emission Natural Gas to Zero Emission H2 Operation, MTZ Worldwide, 6:46-50.

Sotiropoulou, E., Tozzi, L., Yasueda, S.: Improving Efficiency of the Premixed Combustion by Reducing Cyclic Variability. In CIMAC Congress, Paper No. 257, Helsinki, Finland, (2016).

Yasueda, S., Sotiropoulou E., Tozzi, L.: Predicting Autoignition caused by Lubricating Oil in Gas Engines. In CIMAC Congress, Paper No. 37, Shanghai, China, (2013).

Tozzi, L., Sotiropoulou E., Zhu S.: Improving the Efficiency/Emissions Trade-off with a Novel Lean-Burn Precombustion Chamber. In 10th Dessau Gas Engine Conference, Dessau, Germany (2017).

International Search Report in PCT/US2023/027192 dated Dec. 7, 2023.

\* cited by examiner

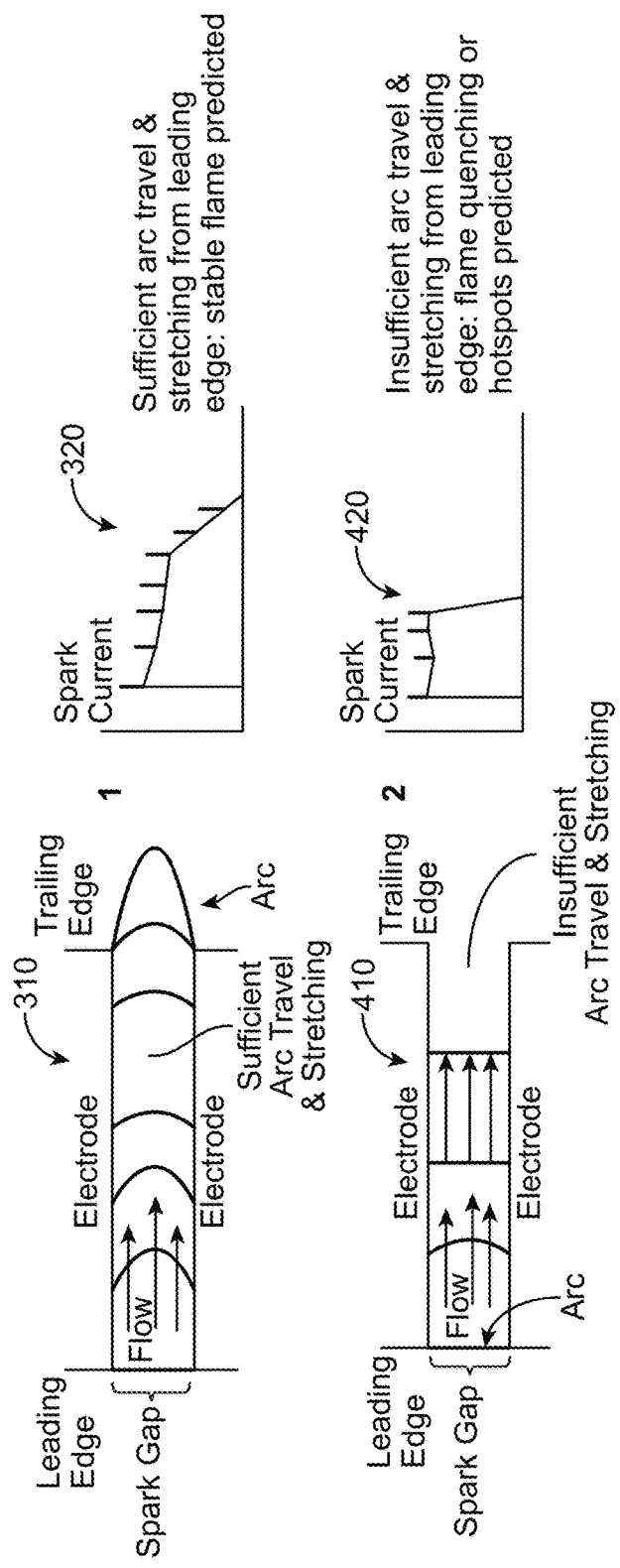

PREDICTIVE MODEL-BASED SPARK CONTROL

I. CROSS-REFERENCE TO RELATED APPLICATIONS

This application is a continuation of U.S. patent application Ser. No. 18/219,692 entitled "Predictive Model-Based Spark Control," and filed Jul. 9, 2023, which claims priority of U.S. Patent Application No. 63/388,359, entitled "Predictive Model-Based Spark Control," and filed Jul. 12, 2022. The entirety of the foregoing patent application is incorporated by reference herein to the extent consistent with the present disclosure.

II. FIELD OF THE INVENTION

The disclosure generally relates to systems and methods for predictive model-based spark control, and more particularly to methods and systems for adjusting the spark energy/power characteristic during the same cycle spark event, to minimize the Start of Combustion (SOC) variations and to significantly reduce the propensity to combustion anomalies, such as backfire, knock and preignition, that prevent achieving high engine power densities and efficiencies.

III. BACKGROUND OF THE INVENTION

The following references describe problems with the state of the art that are more fully described below. These references are incorporated by reference herein to the extent consistent with this disclosure:

[1] "Prechamber Combustion: Enabling the Competitive Carbon-Neutral ICE", Emmanuella Sotiropoulou, Prometheus Applied Technologies, et al, 23rd CIMAC Congress, Jun. 12-16, 2023.
[2] "Ignition Energy and Ignition Probability of Methane-Hydrogen-Air Mixtures", Hankinson G., Mathurkar H., Lowesmith B. J., Loughborough University, Leicestershire, UK—September 2009—h2knowledgecentre.com.
[3] "Arc Travel Ignition Technology", Tozzi L., Sotiropoulou E., Zhu S., Prometheus Applied Technologies, LLC. Lepley D. T., Altronic, LLC, Hoerbiger Engine Solutions. Yasueda S., GDEC, Inc. 15. Tagung "DER ARBEITSPROZESS DES VERBRENNUNGSMOTORS" Sep. 24-25, 2015.
[4] "Optimizing High-Energy Tunable Ignition Technology: Preventing Electrode Damage while Extending the Lean Flammability Limit of Gas Engines," Lepley, D. T., et al, GMRC, October 2014.
[5] Tozzi L., Sotiropoulou E. 2017. Active Scavenge Prechamber. U.S. Pat. No. 9,850,806.
[6] Sotiropoulou, et al, 2020. Prechamber Spark Plugs: The Evolution from Low Emission Natural Gas to Zero Emission H2 Operation, MTZ Worldwide, 6:46-50.

Natural Gas (NG) Internal Combustion Engines, designated as NG-ICEs, and Hydrogen ($H_2$) Internal Combustion Engines, designated as $H_2$-ICEs and defined as engines using any fuel mixture that includes an amount of $H_2$ of at least 10% in addition to NG, Ammonia ($NH_3$) and other fuels, are generally affected by large variations in the Coefficient of Variation of Indicated Mean Effective Pressure (COV-IMEP), high propensity to Lube Oil Autoignition (LOA), Misfire, Backfire, Knock and Preignition defined as extreme combustion instabilities. Due to these constraints, $H_2$-ICEs in particular are limited to relatively low levels of engine power density (IMEP) and indicated Thermal Efficiency (ITE), and to relatively high levels of Nitrous Oxide (NOx) emissions. The best performance currently achieved by state-of-the-art $H_2$-ICEs is limited to the following:

COV-IMEP >2%
IMEP ≤16 bar
ITE ≤41%
NOx ≥100 mg/Nm$^3$

On the other hand, the levels of performance needed for $H_2$-ICEs to be considered a competitive and sustainable energy conversion solution, suitable to compete against Hydrogen Fuel Cells ($H_2$-FCs) would need to deliver the following parameters:

COV-IMEP ≤1%
IMEP ≥20 bar
ITE ≥49%
NOx ≤25 mg/Nm$^3$

Such levels of performance require ultra-lean Hydrogen mixtures having high Lambda ($\lambda$) values greater than $\lambda=3$, in some cases greater than $\lambda=4$. These levels of fuel mixture dilution require high-energy/power spark ignition systems to reliably ignite the Hydrogen mixture at ultra-lean Lambdas and thus reducing the variations in the Start of Combustion (SOC) that can cause the combustion anomalies such as backfire, knock and preignition which significantly reduce the maximum achievable engine power density and efficiency.

An advanced SOC may cause fast combustion, which may result in knock and preignition. In contrast, a retarded SOC may cause slow combustion which may result in backfire, flame quenching and misfire.

Shown in FIG. 1 is a chart 100 indicating that the minimum ignition energy required for $H_2$ at $\lambda=4$ ($\phi=0.25$) 110, is 50 times higher than that at stoichiometry ($\lambda=\phi=1.0$) 120.

However, proper operation with tunable/programmable high-power sparks requires an adequate flow velocity between the electrodes that is high enough to prevent high rate of electrode wear and hot spots, leading to backfire, knock and preignition, but then is low enough to avoid flame kernel blow out leading to engine misfire.

The mechanisms for such combustion anomalies are as follows: Insufficient arc travel of high-power sparks can cause hot spots on the spark plug electrodes resulting in the advancement of the SOC and thus high cylinder combustion pressure and temperatures creating high temperatures regions on valves, spark plug, cylinder head and piston crown. These high temperatures regions will then ignite the incoming stream of rich $H_2$ mixture during intake causing combustion anomalies like backfire, knock and preignition.

Depicted in FIG. 2 is the sequence of phenomena leading to combustion anomalies originated by improper arc travel of high-power sparks ensuing in hot spots on the electrodes.

The formation of hot spots on the electrode can result in an advancement of the SOC causing high cylinder pressure and combustion chamber temperatures (see cycle #83 210 in FIG. 2). These conditions will enhance the combustion heat release rate (HRR) in the next cycle causing even higher cylinder pressure and combustion chamber temperatures (see cycle #84 220 in FIG. 2). As a result, the following cycles may have knock (see cycle #85 230 in FIG. 2) and backfire in the intake (otherwise known as, frontfire)/preignition (see cycle #86 240 in FIG. 2).

The occurrence of these combustion anomalies prevents $H_2$-ICEs from achieving power density (IMEP) levels above approximately 16 bar and thus limits achieving the levels of engine efficiency (ITE) and emission (NOx) needed for H$_2$-ICEs to be considered a sustainable energy conversion solution and thus compete against H$_2$-FC.

There is a need to address the foregoing deficiencies in the art.

IV. BRIEF DESCRIPTION OF THE DRAWINGS

FIG. 3 depicts a spark gap of an electrode 310 and corresponding spark current curve 320 in accordance with certain embodiments.

FIG. 4 depicts a spark gap of an electrode 410 and corresponding spark current curve 420 in accordance with certain embodiments.

FIG. 5 depicts a spark gap of an electrode 510 and corresponding spark current curve 520 in accordance with certain embodiments.

FIG. 6 depicts a spark gap of an electrode 610 and corresponding spark current curve 620 in accordance with certain embodiments.

V. DETAILED DESCRIPTION

Figure 1:
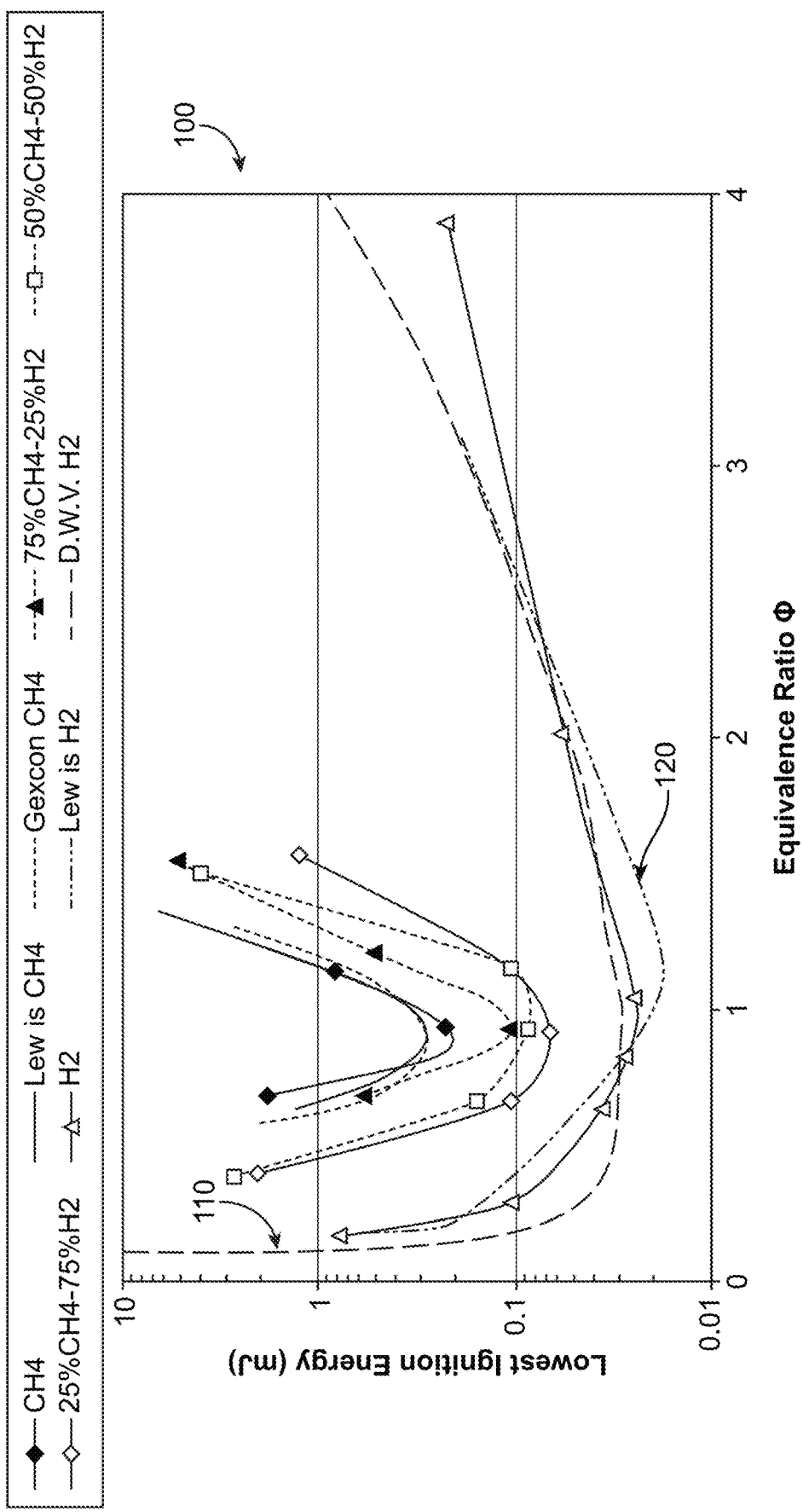
FIG. 1 depicts a graph of minimum ignition energy required for CH$_4$ and H$_2$ in accordance with certain embodiments.

In certain embodiments, the spark current profile (i.e., spark power) may be tailored to the flow velocity in the electrode gap and to the location of spark occurrence. This can permit a less variable SOC and, thus, enable meeting the above engine performance targets with ultra-lean Hydrogen fuel mixtures.

In certain embodiments, the above deficiencies may be mitigated by a method to a) detect the location of the spark and associated flow velocity based on spark voltage trends after voltage breakdown, b) predict the SOC based on simulations correlating spark location, flow velocity, spark power and SOC, and c) adjust the spark waveform/power, during the same spark event, in order to minimize the variations in SOC.

In certain embodiments, a method of controlling the start of combustion in an internal combustion engine is disclosed, comprising: providing a prechamber comprising: an external surface and an internal surface enclosing a prechamber volume; one or more ejection ports communicating between the external surface and the internal surface for introducing a fuel-air mixture into the prechamber volume; a spark-gap electrode assembly, comprising: a primary electrode disposed within the prechamber volume; and one or more ground electrodes disposed within the prechamber volume and offset from the primary electrode to form one or more electrode gaps; introducing a spark across at least one of the one or more electrodes gaps to ignite the fuel-air mixture; measuring the initial trend of spark voltage or spark current of the spark; determining whether the spark was initiated at the leading edge or trailing edge of the electrode gap; determining whether the flow at the location of the spark is fast or slow; and adjusting a power of the spark based on whether the spark was initiated at the leading edge or trailing edge and whether the flow of the spark is fast or slow to control the initial rate of flame propagation by adjusting the ignition delay to maintain a substantially constant start of combustion. The one or more electrode gaps may have a surface-to-volume ratio between about 2 mm$^{-1}$ and about 4 mm$^{-1}$. The surface-to-volume ratio of the one or more electrode gaps may vary proportionally with BMEP from about 2 mm$^{-1}$ for engine power density of about 10 bar BMEP to about 4 mm$^{-1}$ for engine power density of about 20 bar BMEP. The fuel-air mixture may have uniform flow velocity distributions in the prechamber volume and electrode gap that vary by less than 50% from cycle to cycle.

The power of the spark may be adjusted by predetermined amounts determined using combustion simulations and stored in one or more ignition control module lookup tables to achieve a target start of combustion value and to achieve stable engine operation. The power to the spark may be increased if the spark was initiated at the leading edge. The power of the spark may be increased inversely proportional to the flow velocity at the location of the spark. The power to the spark may be decreased if the spark was initiated at the trailing edge. The power of the spark may be decreased inversely proportional to the flow velocity at the location of the spark.

The determining steps may comprise comparing the initial trend of spark voltage or spark current of the spark with predetermined spark waveforms. The predetermined spark waveforms may be determined by considering at least one of whether the spark initially is located between the leading edge and trailing edge and whether the spark initially has a flow velocity between an average leading edge velocity and an average trailing edge velocity. The step of adjusting the power of the spark may be performed in the same cycle in which the spark was introduced to achieve a target start of combustion.

The method may further comprise determining an arc blowout condition exists when a steep, short increase of the spark voltage is detected to be exponential or a sinusoidal ringing. The method may further comprise determining that a stable flame condition exists when either of the following is detected: (1) a flat trend of the spark voltage after a voltage breakdown event followed by a later rate of increase that is above a predetermined value; or (2) an immediate increase in spark voltage after a voltage breakdown event that is not exponential or a sinusoidal ringing and that has a rate of increase below a predetermined value. The method may further comprise determining that a flame quenching or slow combustion condition exists when either of the following is detected: (1) decreasing spark voltage after a voltage breakdown event indicating insufficient arc travel and stretching from the leading edge of the electrodes; or (2) increasing spark voltage at a rate above a predetermined value after a voltage breakdown event indicating an arc blowout is predicted from the trailing edge or leading edge of the electrodes. The method may further comprise determining that a fast combustion or knock condition exists when an increasing spark voltage within a predeterminate range is detected after a voltage breakdown event. The method may further comprise predicting the start of combustion based on one or more of engine design, fuel characteristics and one or more operating conditions using at least one of the spark voltage or the spark current trends after a voltage breakdown event.

In certain embodiments, a high energy programmable ignition system for internal combustion engines is disclosed comprising: at least one of a spark voltage sensor for sensing a spark voltage from one or more spark gap electrodes in a prechamber and a spark current sensor for sensing a spark current from one or more spark gap electrodes in a prechamber; and an ignition control module configured to receive at least one of the spark voltage and the spark current from the one or more spark gap electrodes, measure the initial trend of spark voltage or spark current of the one or more spark gap electrodes; determine whether the spark was initiated at the leading edge or trailing edge of the one or more spark gap electrodes; determine whether the flow at the location of the spark is fast or slow; adjust a power to the spark based on whether the spark was initiated at the leading edge or trailing edge and whether the flow of the spark is fast or slow to control the initial rate of flame growth by adjusting the ignition delay to maintain a substantially constant start of combustion.

The ignition control module may be configured to adjust the power of the spark by predetermined amounts determined using combustion simulations and stored in one or more ignition control module lookup tables to achieve a target start of combustion value and to achieve stable engine operation. The ignition control module may be configured to increase the power to the spark if the spark was initiated at the leading edge. The ignition control module may be configured to increase the power of the spark inversely proportional to the flow velocity at the location of the spark. The ignition control module may be configured to decrease the power to the spark if the spark was initiated at the trailing edge. The ignition control module may be configured to decrease the power of the spark inversely proportional to the flow velocity at the location of the spark.

The ignition control module may be configured to compare the initial trend of spark voltage or spark current of the spark with predetermined spark waveforms. The predetermined spark waveforms may be determined by considering at least one of whether the spark initially is located between the leading edge and trailing edge and whether the spark initially has a flow velocity between an average leading edge velocity and an average trailing edge velocity. The ignition control module may be configured to adjust the power of the spark in the same cycle in which the spark was introduced to achieve a target start of combustion. The ignition control module may be configured to determine an arc blowout condition exists when a steep, short increase of the spark voltage is detected to be exponential or a sinusoidal ringing.

The ignition control module further may be configured to determine that a stable flame condition exists when either of the following is detected: (1) a flat trend of the spark voltage after a voltage breakdown event followed by a later rate of increase that is above a predetermined value; or (2) an immediate increase in spark voltage after a voltage breakdown event that is not exponential or a sinusoidal ringing and that has a rate of increase below a predetermined value. The ignition control module further may be configured to determine that a flame quenching or slow combustion condition exists when either of the following is detected: (1) decreasing spark voltage after a voltage breakdown event indicating insufficient arc travel and stretching from the leading edge of the electrodes; or (2) increasing spark voltage at a rate above a predeterminate value after a voltage breakdown event indicating an arc blowout is predicted from the trailing edge or leading edge of the electrodes. The ignition control module further may be configured to determine that a fast combustion or knock condition exists when an increasing spark voltage within a predetermined range is detected after a voltage breakdown event. The ignition control module further may be configured to predict the start of combustion based on one or more of engine design, fuel characteristics and one or more operating conditions using at least one of the spark voltage or the spark current trends after a voltage breakdown event.

In certain embodiments, advanced 3D combustion CFD (Computational Fluid Dynamic) and 1D modeling and simulations of the ignition kernel dynamic, defined as arc travel and arc stretching occurring at the spark gap electrodes, may be used to create the correlations between the arc voltage and current waveforms, the ignition kernel dynamic and the predicted SOC and flame characteristics. Then, such correlations may be used to derive spark control methods for each engine and spark plug design. This may be used to create a Predictive Model-Based Spark Control having the following functionality:

In certain embodiments as shown in FIG. 3, when a sufficient arc travel and arc stretching 310 is predicted from the spark gap electrodes leading edge to achieve the correct SOC and stable flame, the spark may be ended to avoid electrode hotspots causing early SOC and high rates of electrode wear.

In certain embodiments as shown in FIG. 4, when an insufficient arc travel and stretching 410 is predicted from the leading edge of the electrodes to result in flame quenching or hotspots, an enhancement of the spark waveform or a subsequent spark with enhanced waveform, predicted to achieve the correct SOC and stable flame, may be triggered within the same cycle.

In certain embodiments as shown in FIG. 5, when a sufficient arc stretching 510 is predicted from the trailing edge of the electrodes to achieve the correct SOC and stable flame, the spark may be ended to avoid electrode hotspots causing early SOC and high rates of electrode wear.

In certain embodiments as shown in FIG. 6, when an arc blowout 610 is predicted from the trailing edge or leading edge of the electrodes to result in flame quenching, an enhancement of the spark or a subsequent spark with enhanced waveform, predicted to achieve the correct SOC and stable flame, may be triggered within the same cycle.

Figure 7:
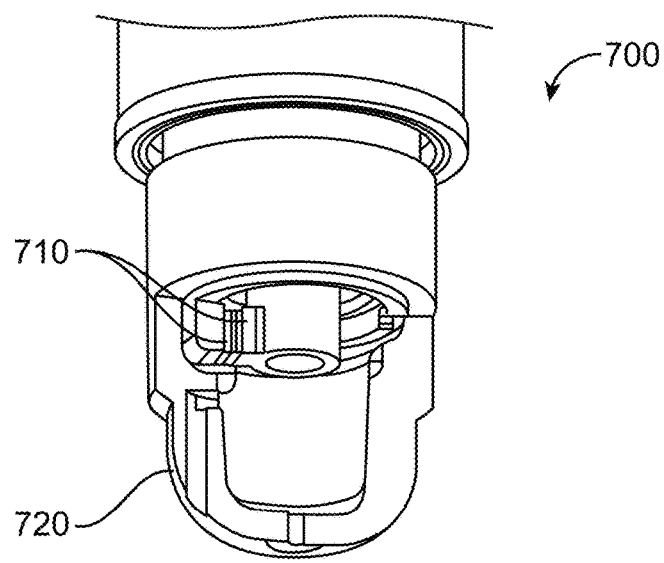
FIG. 7 depicts an Active Scavenge Prechamber design for operation with H$_2$-ICE in accordance with certain embodiments.

In certain embodiments as shown in FIG. 7, an Active Scavenge Prechamber design 700 may have electrodes 710 arranged radially, having a large surface and a small gap designed for achieving high durability, and one or more scavenging ports 720. In certain embodiments having engine power densities equal or greater than 20 bar BMEP, the typical electrode surface may be equal or greater than 9 mm$^2$ and the gap size may be equal or smaller than 0.25 mm. Thus, the resulting gap surface to volume ratio may be equal or greater than 9 mm$^2$/(9 mm$^2$×0.25 mm)=4 mm$^{-1}$. In certain embodiments having engine power densities smaller than 20 bar BMEP, the electrode gap surface to volume ratio may be smaller than 4 mm$^{-1}$. In certain embodiments, in applications having power density of approximately 10 bar BMEP, the electrode surface may be approximately 1 mm$^2$ and the gap size may be approximately 0.5 mm. In these embodiments, the resulting gap surface to volume ratio may be approximately 1 mm$^2$/(1 mm$^2$×0.5 mm)=2 mm$^{-1}$. In certain embodiments, applications having power densities between 10 bar BMEP and 20 bar BMEP, may use electrode surface to volume ratios that are approximately proportional to the power density ratio. For example, an application with power density of 15 bar BMEP may use an electrode surface to 5 volume ratio of approximately 3 mm$^{-1}$ (15/10×2=15/20×4=3).

Figure 8:
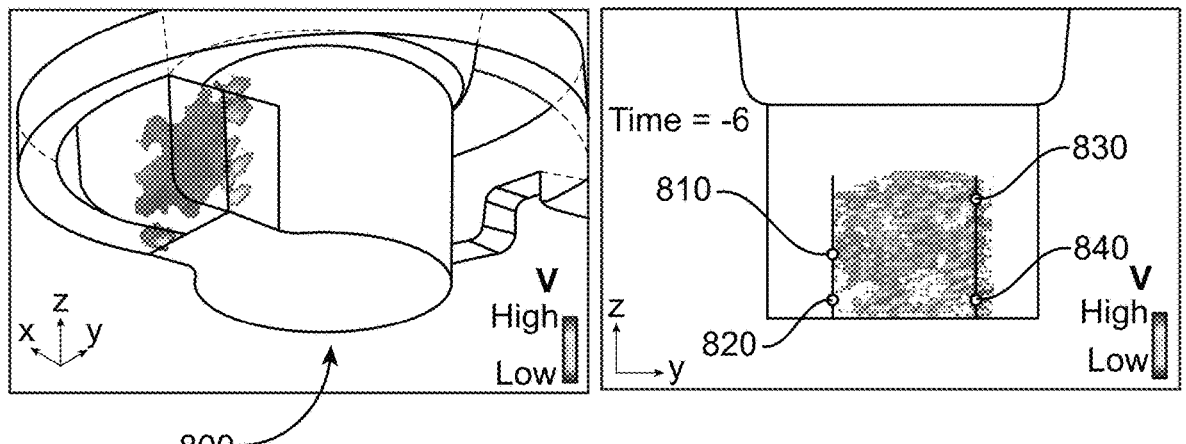
FIG. 8 depicts an electrode gap and four typical spark locations in accordance with certain embodiments.

In certain embodiments, the flow velocity in the gap between the electrodes and four typical spark locations, on the edge of the electrode, of an Active Scavenge prechamber plug 800 with radial gap may be as shown in FIG. 8. In these embodiments, the fuel-air mixture flow velocity distribution in the prechamber volume and the direction of the flow and its magnitude within the electrode gap may be fairly uniform and repeatable with a cycle-to-cycle variation that is less than 50%.

In certain embodiments, four locations may be characterized as follows:
Location (810): Leading edge/Slow Velocity
Location (820): Leading edge/Fast Velocity
Location (830): Trailing edge/Slow Velocity
Location (840): Trailing edge/Fast Velocity Depending on the location where the spark initially takes place and the local flow velocity, the arc travel and the flame kernel development may result in significant variability of the SOC, causing large combustion instability preventing operation at high engine power density (BMEP) and efficiency (BTE), especially with H$_2$-ICE operating with ultra-lean fuel mixture conditions.

Figure 9:
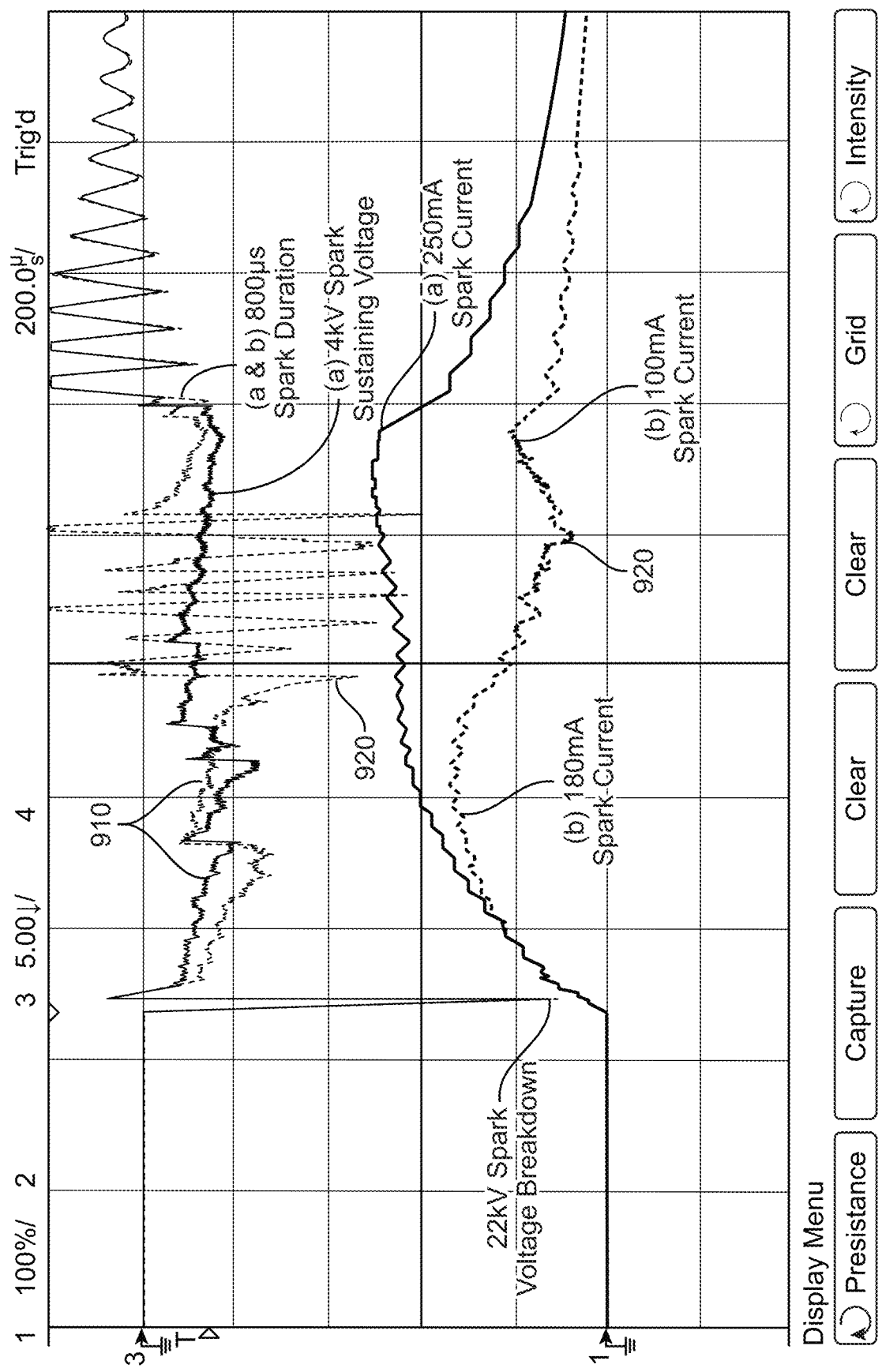
FIG. 9 depicts a typical range of spark voltage and current variabilities obtained during engine operation with an Active Scavenge Prechamber and a high-energy programmable open-loop ignition system in accordance with certain embodiments.

In certain embodiments, a range of spark voltage and current variabilities obtained during engine operation with an Active Scavenge Prechamber and a high-energy programmable open-loop ignition system may be as shown in FIG. 9. Analysis of these waveforms may permit determination of the extent of arc stretching variability 910 and the occurrence of arc blowout 920 identified when a steep, short increase of the spark voltage is detected to be exponential or a sinusoidal ringing.

In certain embodiments, by properly analyzing the spark voltage and current waveforms, it may be possible to determine the general location where the spark first occurred, for example location (810): leading edge/slow velocity or location (840): trailing edge/fast velocity.

In certain embodiments, the general location where the spark first occurred may be used to generate a prediction of the rate of flame growth and resulting SOC using validated combustion CFD. The values of the spark locations and corresponding SOC predictions may be compiled in a lookup table.

Figure 10:
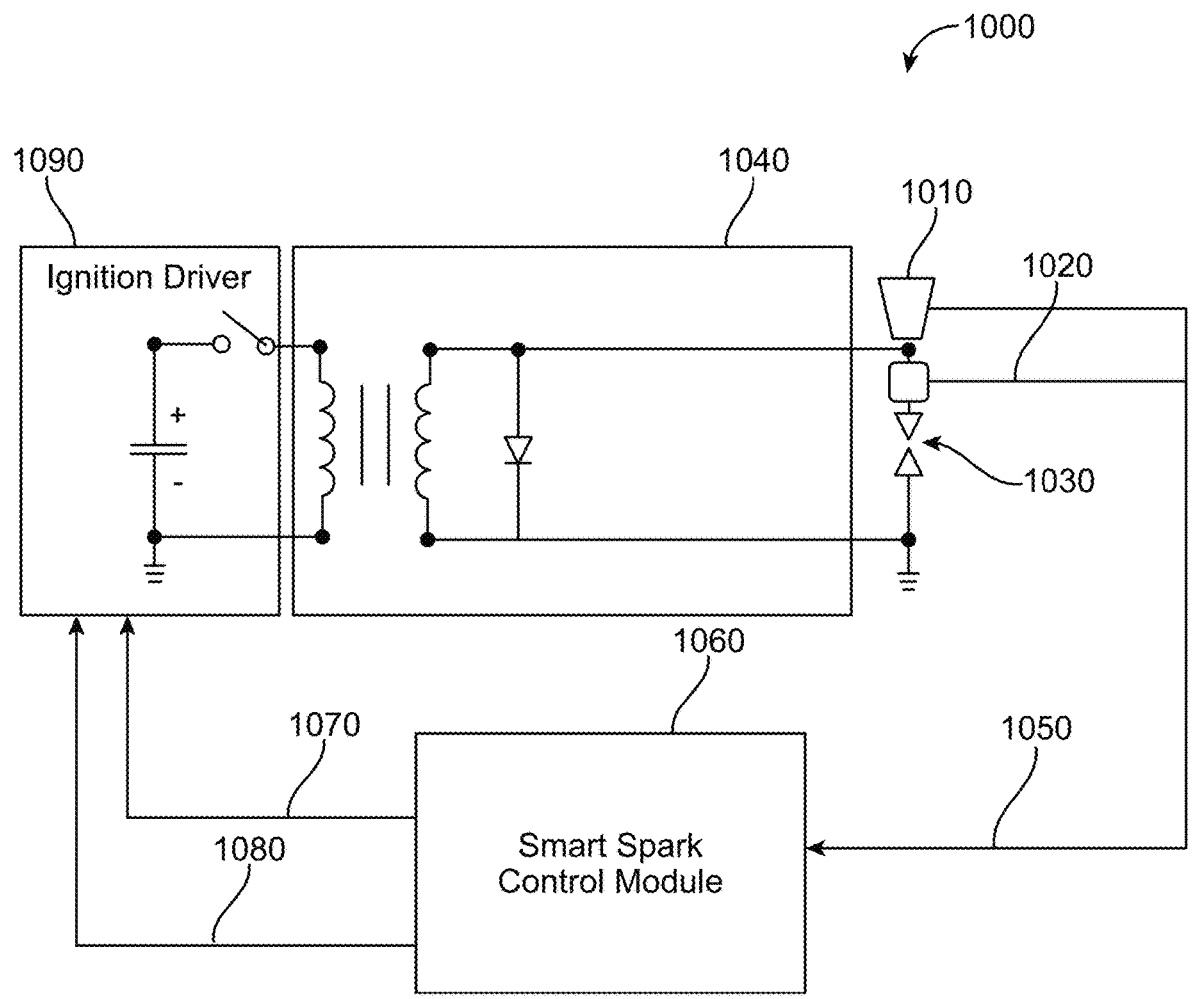
FIG. 10 depicts an ignition system with added spark voltage and current sensors and Smart Spark Control Module in accordance with certain embodiments.

In certain embodiments as shown in FIG. 10, a Predictive Model-Based Spark Control may include a programmable high-energy, closed-loop ignition system 1000 with added spark voltage sensor 1010 and current sensor 1020 of spark plug 1030 to the ignition coil secondary windings constituting the ignition coil 1040. These sensors may provide the spark waveform feedback signal 1050 to the Smart Spark Control Module 1060 (otherwise known as Ignition Control Module) that generates a spark waveform control signal 1070 and a spark trigger control signal 1080 to the Ignition Driver 1090 which in turn may adjust the ongoing (a.k.a., nominal) spark current waveform, during the same spark event, to a predeterminate current waveform stored in an Ignition Control Module lookup table, as necessary to achieve a SOC that is sufficiently close to the target value, thus reducing the combustion cycle-to-cycle variabilities and the occurrence of combustion anomalies like backfire, knock and preignition.

In certain embodiments, the spark voltage sensor 1010, the spark current sensors 1020 and the Smart Spark Control Module 1060 may be incorporated in a high-energy programmable spark ignition system. In certain embodiments, the high-energy programmable spark ignition system may be as described in reference [4] above.

Figure 11:
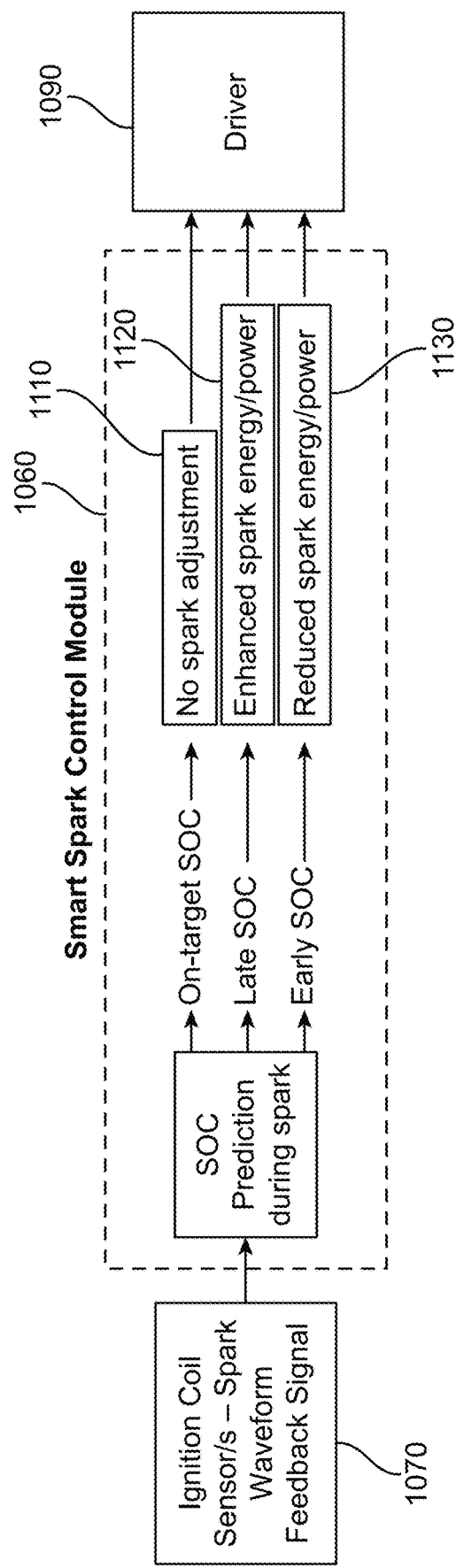
FIG. 11 depicts a flow chart of a predictive model-based spark control system in accordance with certain embodiments.

In certain embodiments, the overall functionality of the Predictive Model-Based Spark Control System (a.k.a., Adaptive Control Prechamber Ignition System) may be as depicted in FIG. 11.

In certain embodiments, the spark waveform feedback signal from the ignition coil may be used by the Smart Spark Control Module to predict the SOC based on combustion simulation results stored in lookup tables and to issue three primary commands to the Ignition Driver as follows:
a. No adjustment of the ongoing spark if the predicted SOC is on target 1110.
b. Enhance the ongoing spark energy/power to a predeterminate spark waveform stored in lookup tables if the predicted SOC occurs later than target 1120.
c. Reduce the ongoing spark energy/power to a predeterminate spark waveform stored in lookup tables if the predicted SOC occurs earlier than target 1130.

In certain embodiments, based on the above input commands the Ignition Driver 1090 may generate the primary pulses to the ignition coil required to obtain the predetermined spark waveform stored in lookup tables which is necessary to achieve an SOC close to the target value and, hence, reduce the cycle-to-cycle variations in the SOC.

Figure 12:
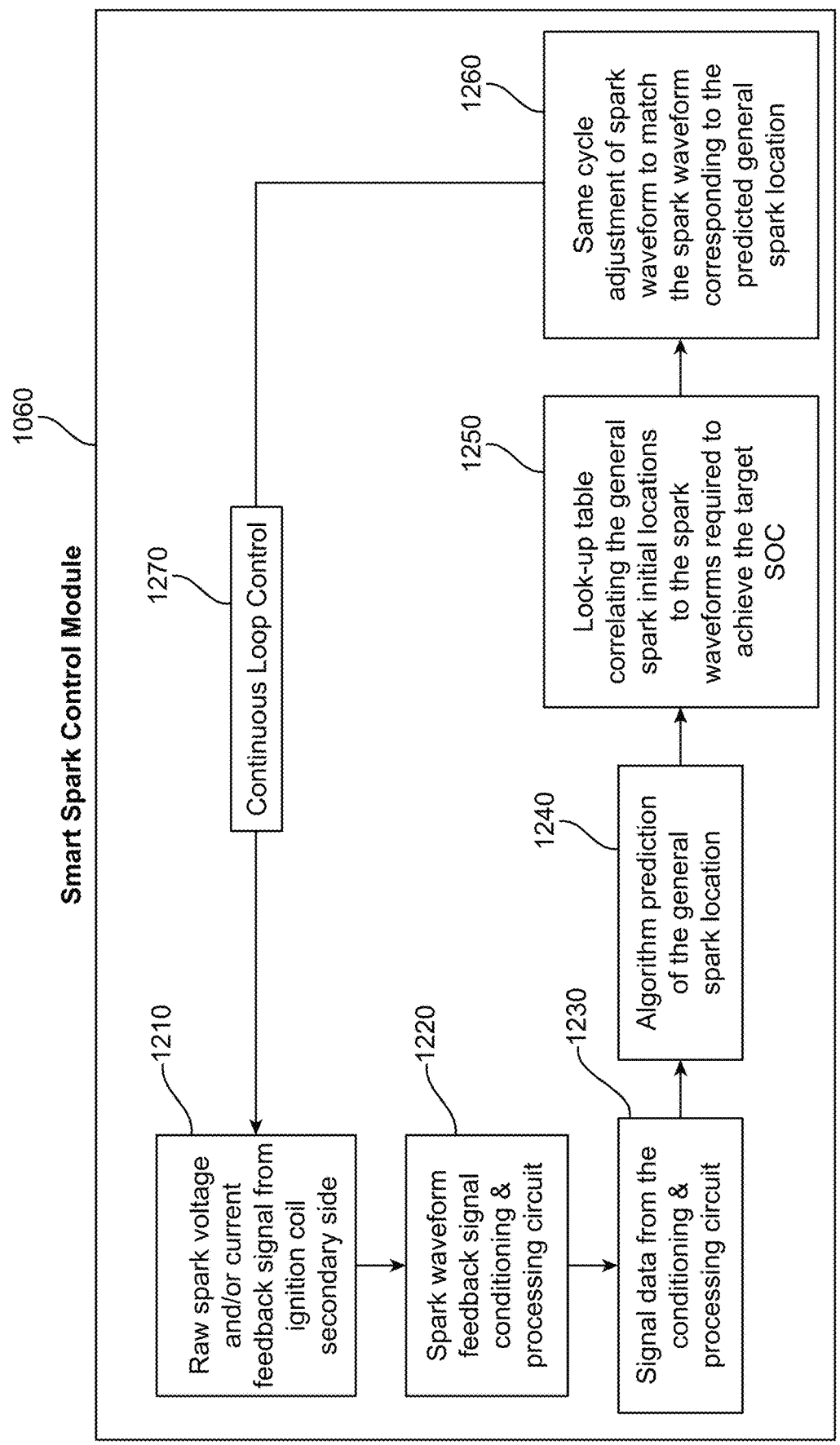
FIG. 12 depicts a flow chart of a predictive model-based spark control method in accordance with certain embodiments.

In certain embodiments as shown in FIG. 12, a Predictive Model-Based Spark Control Method may include the following steps: In step 1210, the raw voltage and/or current feedback signal from the ignition coil secondary side may be fed to the Smart Spark Control Module signal conditioning and processing circuit. In step 1220, the spark waveform feedback signal may be converted into signal data by the signal conditioning and processing circuit.

Figure 13:
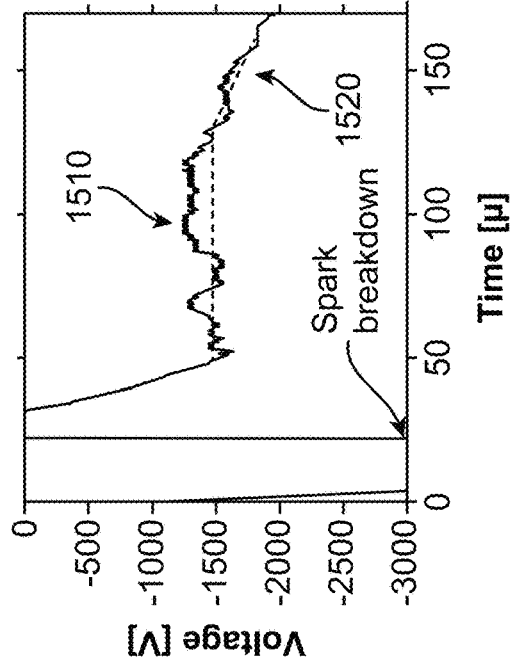
FIG. 13 depicts a steep arc voltage increase following a spark breakdown in accordance with certain embodiments.
Figure 14:
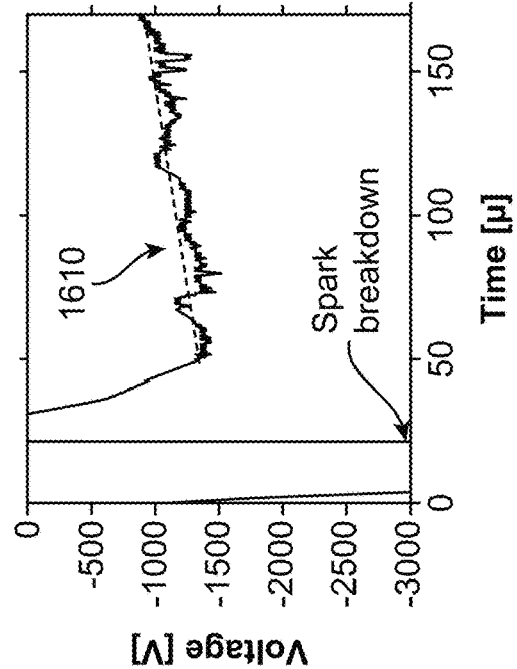
FIG. 14 depicts a gradual arc voltage increase following a spark breakdown in accordance with certain embodiments.
Figure 15:
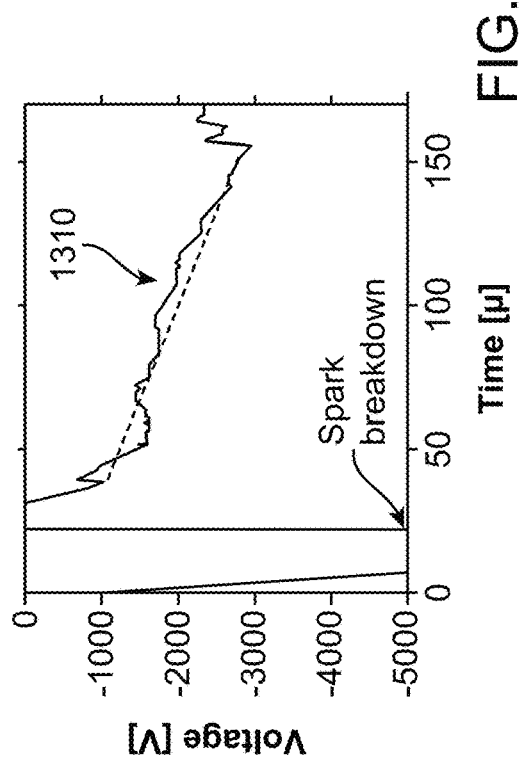
FIG. 15 depicts a flat arc voltage following a spark breakdown with a steep increase at a later time in accordance with certain embodiments.
Figure 16:
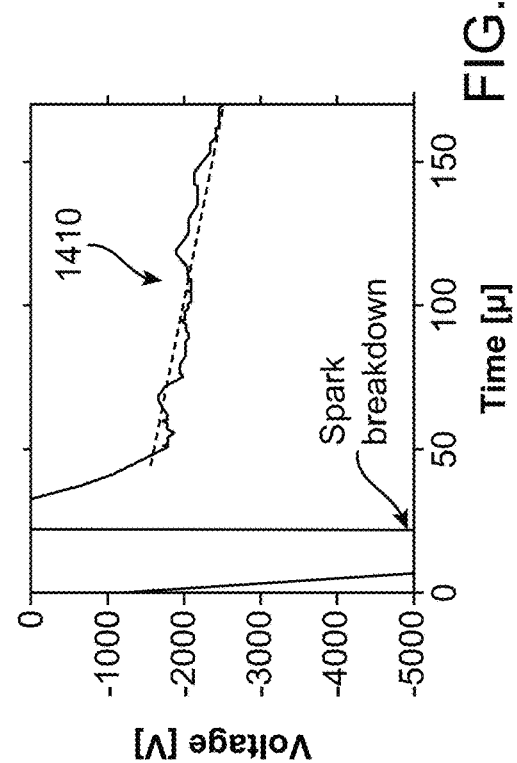
FIG. 16 depicts an arc voltage decrease following a spark breakdown in accordance with certain embodiments.

In certain embodiments as shown in step 1230, the signal data from the conditioning and processing circuit may have specific trends which provide the basis for determining the general initial spark location and associated flow velocity. Exemplary trends are shown in FIGS. 13-16. FIG. 13 shows an example of a steep arc voltage increase 1310 that is equal or greater than approximately 20 Volts/μs following the spark breakdown. FIG. 14 shows an example of gradual arc voltage increase 1410 that is in the range of approximately 10 Volts/μs, following the spark breakdown. FIG. 15 shows an example of flat arc voltage 1510 following the spark breakdown with steep rise 1520 at a later time. FIG. 16 shows an example of arc voltage decrease 1610 following the spark breakdown.

In certain embodiments as shown in step 1240, the signal data may be derived from the spark voltage after the voltage breakdown event and may be used with a method that predicts the general initial spark location and associated flow velocity based on the specific trend of the signal. Following are some exemplary predictions: The trend shown in FIG. 13 may be indicative of a trailing edge spark occurring at a fast location (for example location 840, having a velocity of approximately 20 m/s) and can result in a fast combustion or knock condition. The trend shown in FIG. 14 may be indicative of a trailing edge spark occurring at a slow location (for example location 830, having a velocity of approximately 10 m/s) and can result in a stable flame producing a normal combustion having a SOC close to target. The trend shown in FIG. 15 may be indicative of a leading edge spark occurring at a fast location (for example location 820, having a velocity of approximately 15 m/s) and can result in a stable flame producing a normal combustion having a SOC close to target. The trend shown in FIG. 16 may be indicative of a leading edge spark occurring at a slow location (for example location 810, having a velocity of approximately 10 m/s) and can result in slow combustion or quenching condition.

Figure 17:
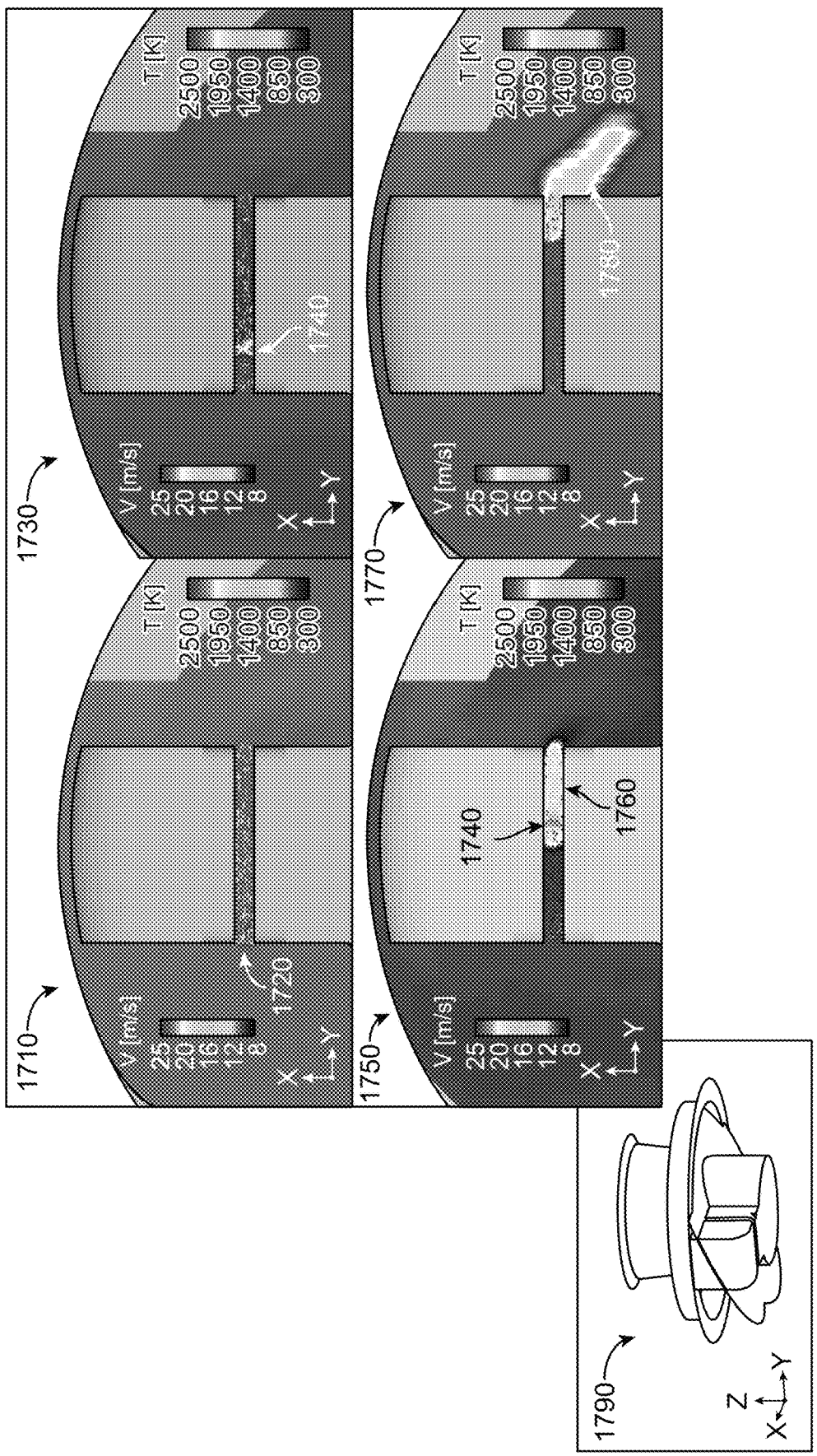
FIG. 17 depicts a combustion CFD simulation for a leading-edge spark occurring at a slow location in accordance with certain embodiments.

In certain embodiments as shown in Step 1250, the general initial spark location and associated flow velocity information may be used in a look-up table where the correlation between general initial spark locations and associated flow velocity, spark waveforms and target SOC value are provided based on combustion CFD simulation predictions. In certain embodiments, a combustion CFD simulation for a leading edge spark occurring at a slow location (for example location 810) may be as shown in FIG. 17. It can be seen that, in the case of location 810, an initial flame front may be achieved after about 4.8 crank angle degrees (CAD) (11.70−6.90=4.8). This initial flame front, for example, may be used to define the SOC. In certain embodiments, the CFD images depicted in FIG. 17 show the flow velocity field within the spark gap being uniform and having a magnitude of approximately 10 m/s. Image 1710 shows the initial spark 1720 taking place at the leading edge at −11.70 CAD timing. Image 1730 shows that at −10.09 CAD timing the arc has travelled 1740 within the gap by approximately 0.6 mm due to the force acting onto the arc by the flow field. Image 1750 shows at −8.50 CAD a flame kernel 1760 has developed within the electrode gap. Image 1770 shows that at −6.90 CAD an initial flame 1780 front is formed outside the gap. This condition is defined as the Start of Combustion (SOC). The total time from the occurrence of the spark (−11.70 CAD) to the SOC (−6.90 CAD) defines an ignition delay of 4.8 CAD. For given engine operating conditions, maintaining a consistent ignition delay (or SOC) may be achieved by the predictive model-based spark control, which may prevent the occurrence of abnormal combustion limiting the attainment of higher engine power density and efficiency.

Figure 18:
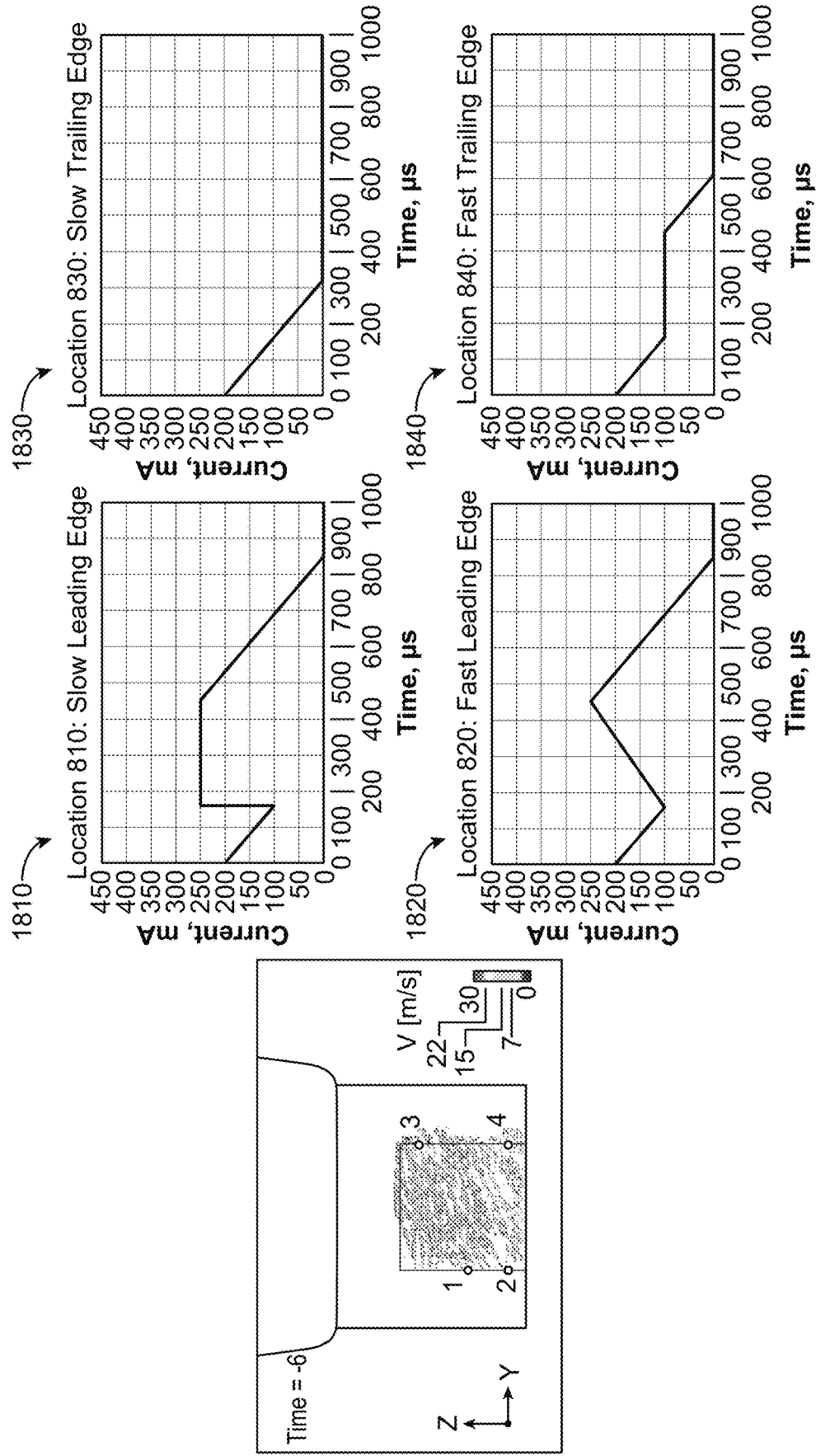
FIG. 18 depicts a lookup table correlating the initial location of a spark to a spark waveform required to achieve a target SOC value in accordance with certain embodiments.

Other examples of combustion simulations for different sparks occurring at different locations are provided in reference [1] above. In certain embodiments as shown in FIG. 18, an example lookup table may correlate the spark general initial locations to the spark waveforms required to achieve the target SOC value. In certain embodiments, the spark current profile 1810 may correlate to location 810 slow leading edge, the spark current profile 1820 may correlate to location 820 fast leading edge, the spark current profile 1830 may correlate to location 830 slow trailing edge, and the spark current profile 1840 may correlate to location 840 fast trailing edge.

In certain embodiments, for any given target SOC, higher energy/power sparks may be required when the general initial spark location is the leading edge, and the spark energy/power may be inversely proportional to the flow velocity at the location of spark. Conversely, lower energy/power sparks may be required when the general initial spark location is the trailing edge. The target SOC may be dependent on the ignition timing (IT) and may be defined to be approximately in the middle of the range of the SOC variations.

In certain embodiments as shown in Step 1260, same-cycle adjustment of the ongoing spark waveform may be made to match the predetermined spark waveform from the lookup table 1250 that corresponds to the predicted general initial spark location and may be required to achieve the target SOC. For example, if the previous cycle had spark location 810 (slow leading edge) and the prediction for the present cycle is location 830 (slow trailing edge), then the spark waveform should be adjusted from waveform 1810 to waveform 1830.

In certain embodiments as shown in Step 1270, continuous loop control may be performed for each combustion cycle by the Smart Spark Control Module to make same-cycle adjustment to the ongoing spark waveform as necessary to match the predetermined spark waveform from the lookup table that corresponds to the predicted general initial spark location and may be required to achieve the target SOC.

Figure 2:
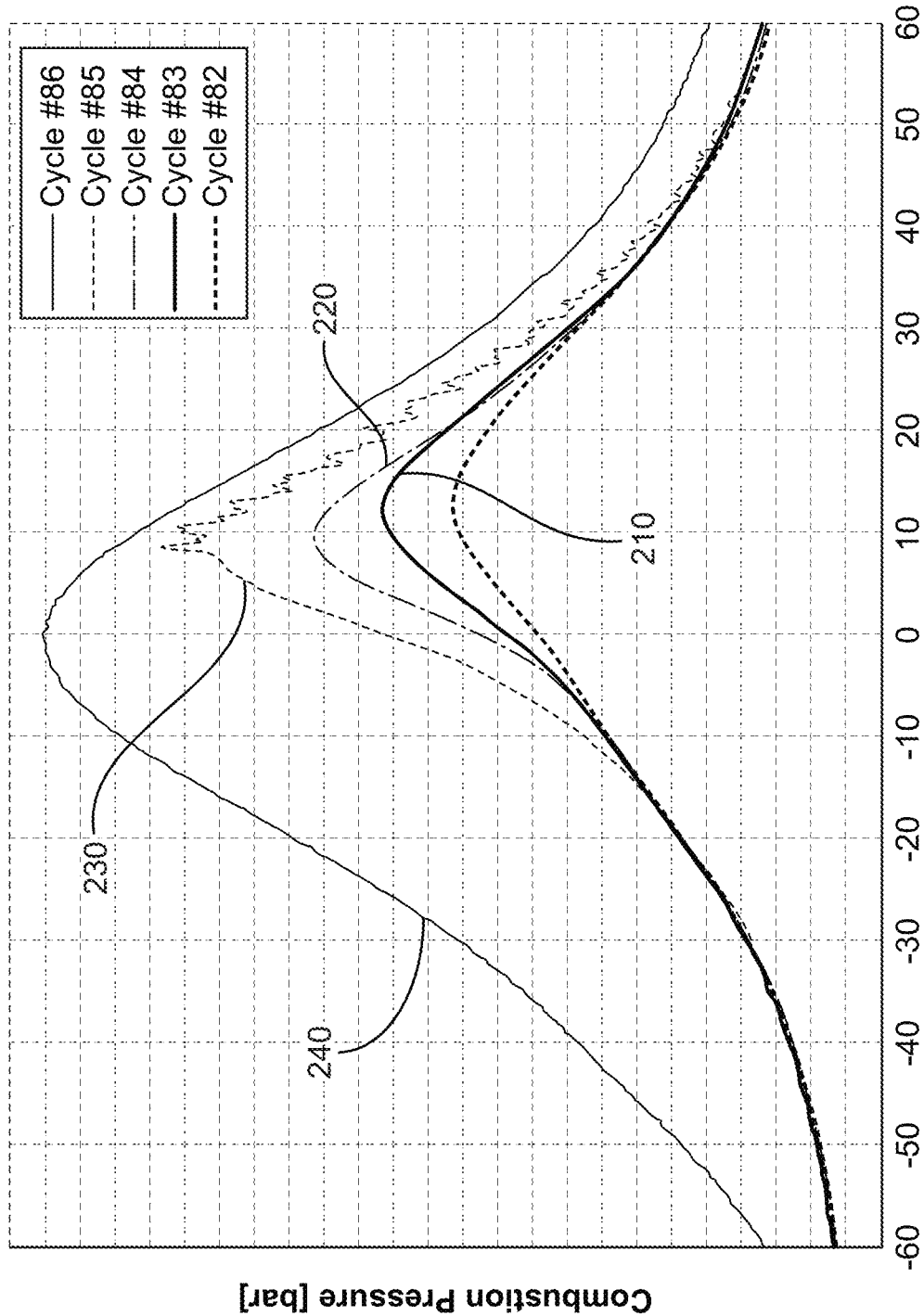
FIG. 2 depicts sequences of events leading to combustion anomalies in an H$_2$-ICE in accordance with certain embodiments.

The Predictive Model-Based Spark Control of certain embodiments improves upon the state of the art. The combustion instabilities (backfire, knock and preignition shown in FIG. 2), primarily experienced with but not limited to Hydrogen engines, may be mitigated by improving the air-fuel mixture homogeneity and by reducing the engine power output which in turn reduces the engine efficiency. There are no known ignition systems featuring adaptive spark control that can mitigate the extent of combustion instabilities as defined in this disclosure. Neither high nor low energy/power ignition systems are able to mitigate combustion instability especially with Hydrogen engines to any meaningful extent.

Figure 19:
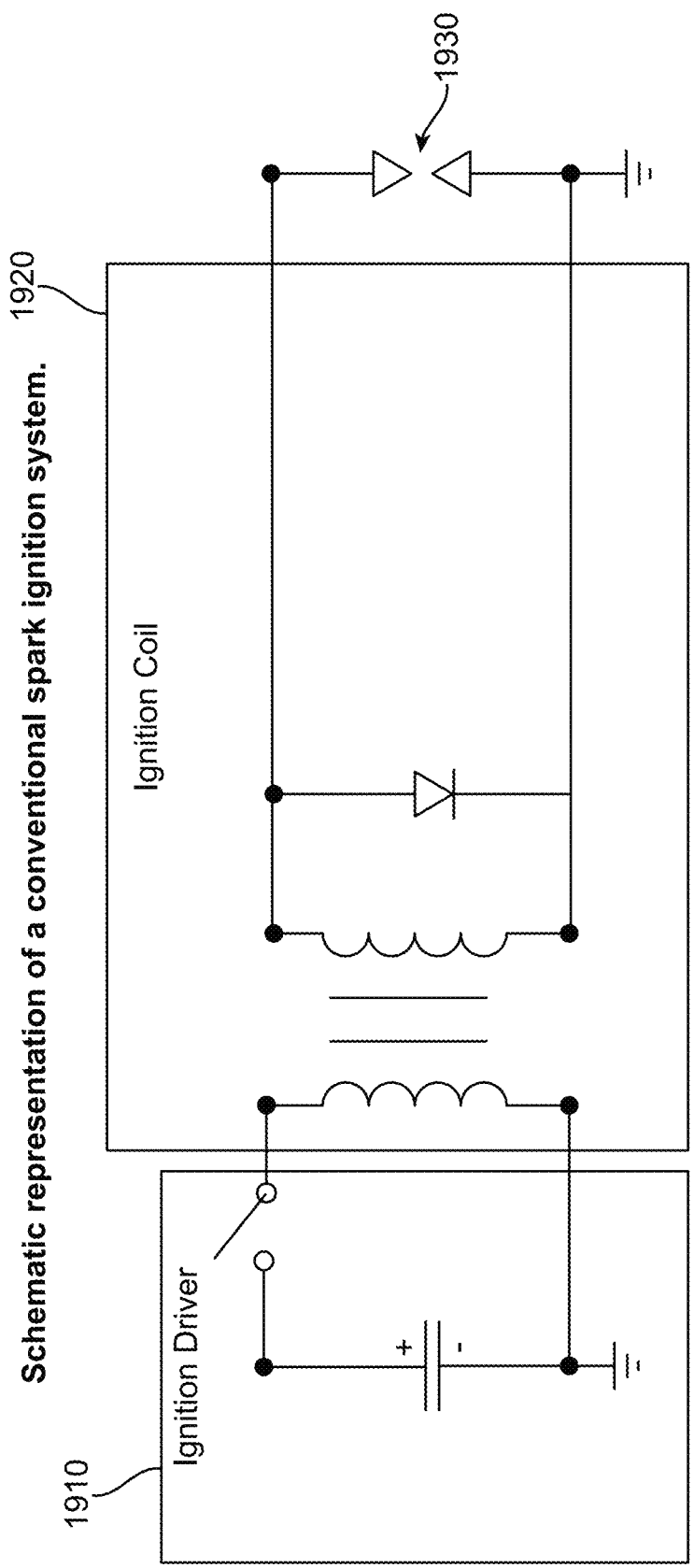
FIG. 19 depicts a conventional spark ignition system in accordance with certain embodiments.

In certain embodiments, a conventional spark ignition system may include an ignition driver 1910, an ignition coil 1920 and a spark plug 1930 as shown in FIG. 19. Compared to the conventional system (FIG. 19), the Predictive Model-Based Spark Control system (otherwise known as Adaptive Control Prechamber Ignition system 1000 as shown for example in FIGS. 10 and 11) may feature: voltage sensors 1010 and/or current sensors 1020 on the secondary side of the coil windings 1040 as shown in FIG. 10; a Smart Spark Control Module 1060 as shown in FIGS. 10 and 11; and a communication path to feed the Spark Waveform Control Signal 1070 and the Spark Trigger Control Signal 1080 from the Smart Spark Control Module to the Ignition Driver 1090 as shown in FIG. 10.

In certain embodiments, remarkable improvements in $H_2$-ICE performance may be achieved with the combination of Active Scavenge Prechamber technology and Predictive Model-Based Spark Control.

In certain embodiments, advanced combustion modeling and simulations of the ignition process including the spark event, the arc-travel and stretching, and resulting flame propagation may be used to predict the relationship between the spark energy/power, the flow within the electrode gap, and the initial flame development defining the SOC for different engines and at various conditions. This information may be used to adjust the spark energy/power characteristic during the same cycle spark event, to minimize the SOC variations and to significantly reduce the propensity to combustion anomalies, such as backfire, knock and preignition, that prevent achieving high engine power densities and efficiencies.

In certain embodiments, spark voltage and/or current from the secondary side of the coil windings may be used as feedback signal/s 1050 by the Smart Spark Control Module 1060 (FIG. 11) which controls the Ignition Driver 1090 (FIG. 10) and allows the necessary adjustment in the spark current waveform to minimize the SOC variations.

In certain embodiments, the initial trend of the spark voltage signal after the voltage breakdown event may be used to determine the location where the spark first occurs and the flow velocity at that location. This information may be used to predict the time of the SOC occurrence. Then correlations between spark power and SOC, which may be stored in lookup tables, may be used to adjust the ongoing spark power to match the target SOC. This method of controlling the spark power during the same cycle spark event may be necessary to reduce the variations in SOC which may result in improved engine combustion performance and emissions. Moreover, controlling the spark power during the same cycle spark event may minimize the rate of electrode erosion with high-energy ignition systems and thus may enable remarkable improvements in the spark plug electrode durability.

Accordingly, certain embodiments offer the unique advantage of enabling engines fueled with Hydrogen mixtures to operate at higher power densities, with higher efficiency and lower emissions. This means that, as a result of this invention, Hydrogen engines can compete with fuel cells and thus provide a viable alternative to accelerate the global decarbonization.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not a limitation of the invention.

We claim:

1. A method of controlling the start of combustion in an internal combustion engine, comprising:
providing a prechamber comprising:
an external surface and an internal surface enclosing a prechamber volume;
one or more ejection ports communicating between the external surface and the internal surface for introducing a fuel-air mixture into the prechamber volume;
a spark-gap electrode assembly, comprising:
a primary electrode disposed within the prechamber volume; and
one or more ground electrodes disposed within the prechamber volume and offset from the primary electrode to form one or more electrode gaps;
introducing a spark across at least one of the one or more electrodes gaps to ignite the fuel-air mixture;
measuring the initial trend of spark voltage or spark current of the spark;
determining whether the spark was initiated at the leading edge or trailing edge of the electrode gap;
determining whether the flow at the location of the spark is fast or slow; and
adjusting a power of the spark based on whether the spark was initiated at the leading edge or trailing edge and whether the flow of the spark is fast or slow to control the rate of flame propagation to maintain a substantially constant start of combustion.

2. The method of claim 1, wherein the power of the spark is adjusted by predetermined amounts determined using combustion simulations and stored in one or more ignition control module lookup tables to achieve a target start of combustion value and to achieve stable engine operation.

3. The method of claim 1, wherein the power to the spark is increased if the spark was initiated at the leading edge.

4. The method of claim 3, wherein the power of the spark is increased inversely proportional to the flow velocity at the location of the spark.

5. The method of claim 1, wherein the power to the spark is decreased if the spark was initiated at the trailing edge.

6. The method of claim 5, wherein the power of the spark is decreased inversely proportional to the flow velocity at the location of the spark.

7. The method of claim 1, wherein the determining steps comprise comparing the initial trend of spark voltage or spark current of the spark with predetermined spark waveforms.

8. The method of claim 7, wherein the predetermined spark waveforms are determined by considering at least one of whether the spark initially is located between the leading edge and trailing edge and whether the spark initially has a flow velocity between an average leading edge velocity and an average trailing edge velocity.

9. The method of claim 1, further comprising determining an arc blowout condition exists when a steep, short increase of the spark voltage is detected to be exponential or a sinusoidal ringing.

10. The method of claim 9, further comprising enhancing the spark or generating a subsequent spark with an enhanced waveform within the same cycle to achieve the desired start of combustion, when an arc blowout is predicted.

11. The method of claim 1, further comprising determining that a stable flame condition exists when either of the following is detected: (1) a flat trend of the spark voltage after a voltage breakdown event followed by a later rate of increase that is above a predetermined value; or (2) an immediate increase in spark voltage after a voltage breakdown event that is not exponential or a sinusoidal ringing and that has a rate of increase below a predetermined value.

12. The method of claim 1, further comprising determining that a flame quenching or slow combustion condition exists when either of the following is detected: (1) decreasing spark voltage after a voltage breakdown event indicating insufficient arc travel and stretching from the leading edge of the electrodes; or (2) increasing spark voltage at a rate above a predetermined value after a voltage breakdown event indicating an arc blowout is predicted from the trailing edge or leading edge of the electrodes.

13. The method of claim 1, further comprising determining that a fast combustion or knock condition exists when an increasing spark voltage within a predeterminate range is detected after a voltage breakdown event.

14. The method of claim 1, further comprising predicting the start of combustion based on one or more of engine design, fuel characteristics and one or more operating conditions using at least one of the spark voltage or the spark current trends after a voltage breakdown event.

15. The method of claim 1, further comprising enhancing the spark or generating a subsequent spark with an enhanced waveform within the same cycle to achieve the desired start of combustion when an insufficient arc travel and stretching is predicted.

16. The method of claim 1, further comprising terminating the spark when a sufficient arc travel and arc stretching is predicted.

17. An ignition system for internal combustion engines comprising:
at least one of a spark voltage sensor for sensing a spark voltage from one or more spark gap electrodes in a prechamber and a spark current sensor for sensing a spark current from one or more spark gap electrodes; and
an ignition control module configured to
receive at least one of the spark voltage and the spark current from the one or more spark gap electrodes,
measure the initial trend of spark voltage or spark current of the one or more spark gap electrodes;
determine whether the spark was initiated at the leading edge or trailing edge of the one or more spark gap electrodes;
determine whether the flow at the location of the spark is fast or slow;
adjust a power to the based on whether the spark was initiated at the leading edge or trailing edge and whether the flow of the spark is fast or slow to control the rate of flame growth to maintain a substantially constant start of combustion.

18. The system of claim 17, wherein the ignition control module is configured to adjust the power of the spark by predetermined amounts determined using combustion simulations and stored in one or more ignition control module lookup tables to achieve a target start of combustion value and to achieve stable engine operation.

19. The system of claim 17, wherein the ignition control module is configured to increase the power to the spark if the spark was initiated at the leading edge.

20. The system of claim 19, wherein the ignition control module is configured to increase the power of the spark inversely proportional to the flow velocity at the location of the spark.

21. The system of claim 17, wherein the ignition control module is configured to decrease the power to the spark if the spark was initiated at the trailing edge.

22. The system of claim 21, wherein the ignition control module is configured to decrease the power of the spark inversely proportional to the flow velocity at the location of the spark.

23. The system of claim 17, wherein the ignition control module is configured to compare the initial trend of spark voltage or spark current of the spark with predetermined spark waveforms.

24. The system of claim 23, wherein the predetermined spark waveforms are determined by considering at least one of whether the spark initially is located between the leading edge and trailing edge and whether the spark initially has a flow velocity between an average leading edge velocity and an average trailing edge velocity.

25. The system of claim 17, wherein the ignition control module is configured to determine an arc blowout condition exists when a steep, short increase of the spark voltage is detected to be exponential or a sinusoidal ringing.

26. The system of claim 25, wherein the ignition control module is configured to enhance the spark or generate a subsequent spark with an enhanced waveform within the same cycle to achieve the desired start of combustion, when an arc blowout is predicted.

27. The system of claim 17, wherein the ignition control module further is configured to determine that a stable flame condition exists when either of the following is detected: (1) a flat trend of the spark voltage after a voltage breakdown event followed by a later rate of increase that is above a predetermined value; or (2) an immediate increase in spark voltage after a voltage breakdown event that is not exponential or a sinusoidal ringing and that has a rate of increase below a predetermined value.

28. The system of claim 17, wherein the ignition control module further is configured to determine that a flame quenching or slow combustion condition exists when either of the following is detected: (1) decreasing spark voltage after a voltage breakdown event indicating insufficient arc travel and stretching from the leading edge of the electrodes; or (2) increasing spark voltage at a rate above a predeterminate value after a voltage breakdown event indicating an arc blowout is predicted from the trailing edge or leading edge of the electrodes.

29. The system of claim 17, wherein the ignition control module further is configured to determine that a fast combustion or knock condition exists when an increasing spark voltage within a predetermined range is detected after a voltage breakdown event.

30. The system of claim 17, wherein the ignition control module further is configured to predict the start of combustion based on one or more of engine design, fuel characteristics and one or more operating conditions using at least one of the spark voltage or the spark current trends after a voltage breakdown event.

* * * * *